Feb. 22, 1938.                H. M. PFLAGER                 2,109,276
                         RAILWAY VEHICLE STRUCTURE
                           Filed Jan. 12, 1935          5 Sheets-Sheet 1
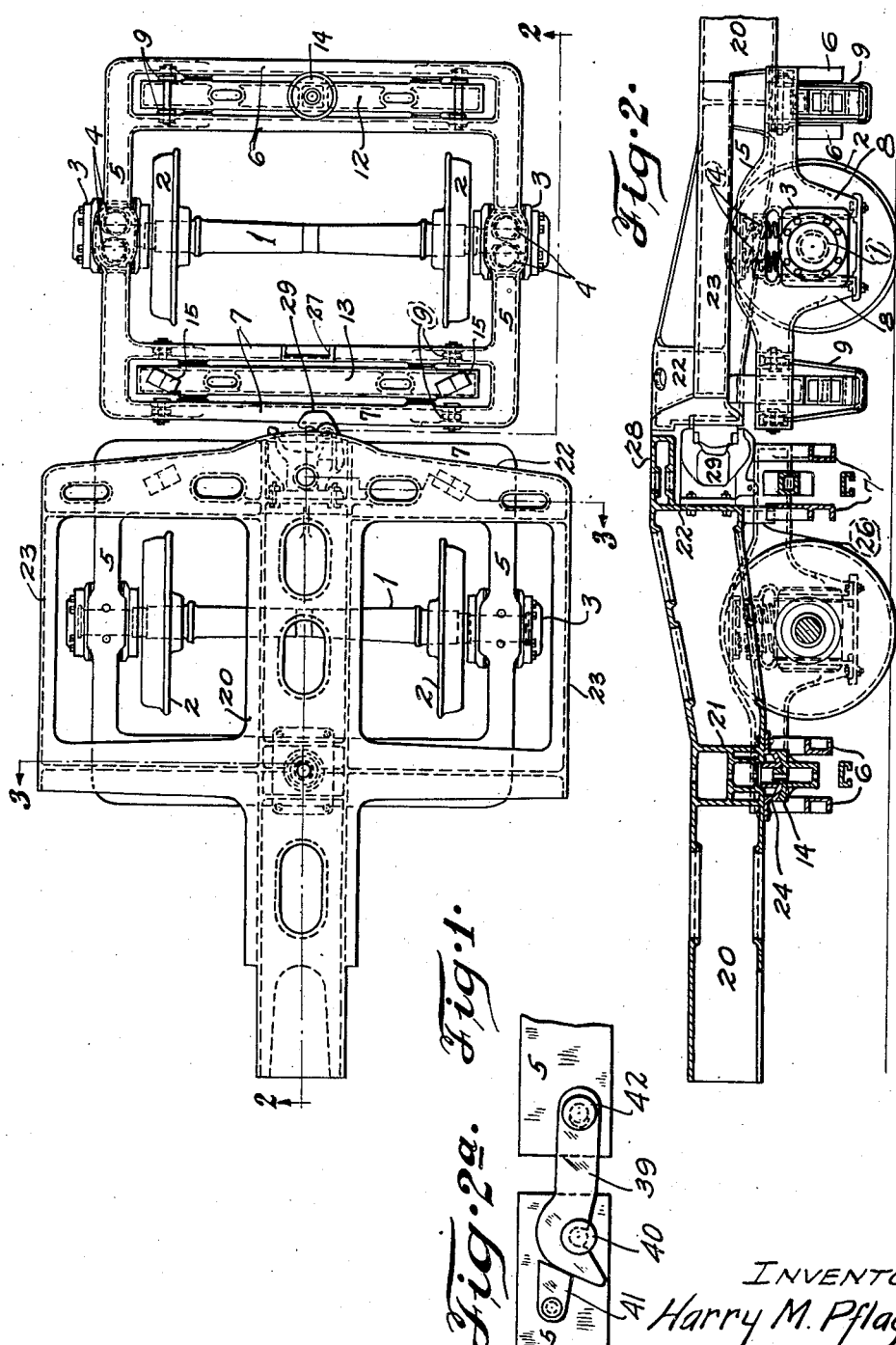

Feb. 22, 1938.  H. M. PFLAGER  2,109,276
RAILWAY VEHICLE STRUCTURE
Filed Jan. 12, 1935  5 Sheets-Sheet 2
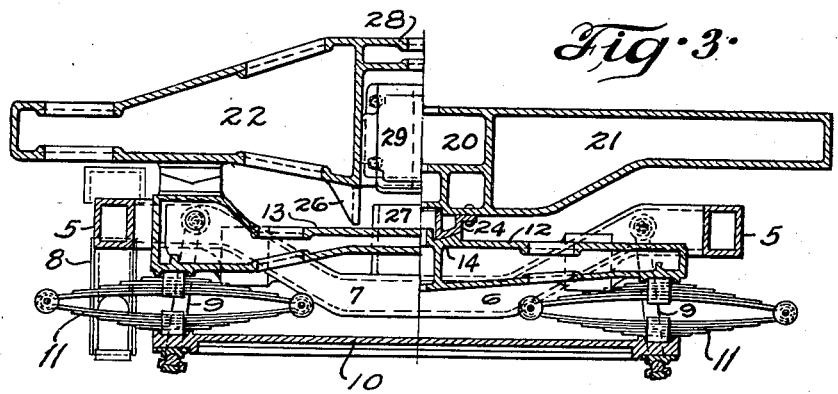
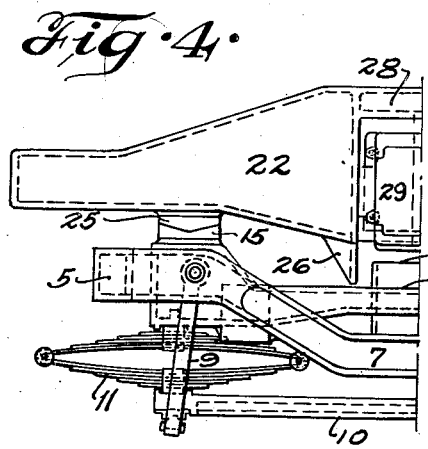
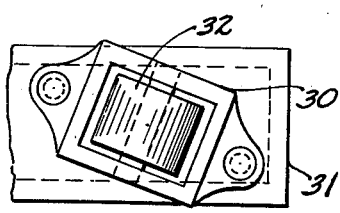
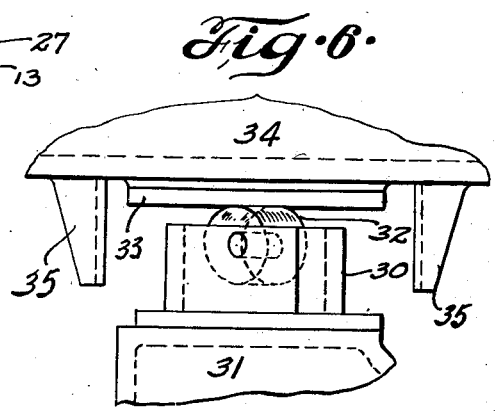
INVENTOR
Harry M. Pflager
BY Rodney Bedell
ATTORNEY Feb. 22, 1938. H. M. PFLAGER 2,109,276
RAILWAY VEHICLE STRUCTURE
Filed Jan. 12, 1935 5 Sheets-Sheet 3

INVENTOR
Harry M. Pflager
BY Rodney Bedell
ATTORNEY

Feb. 22, 1938. H. M. PFLAGER 2,109,276
RAILWAY VEHICLE STRUCTURE
Filed Jan. 12, 1935 5 Sheets-Sheet 4
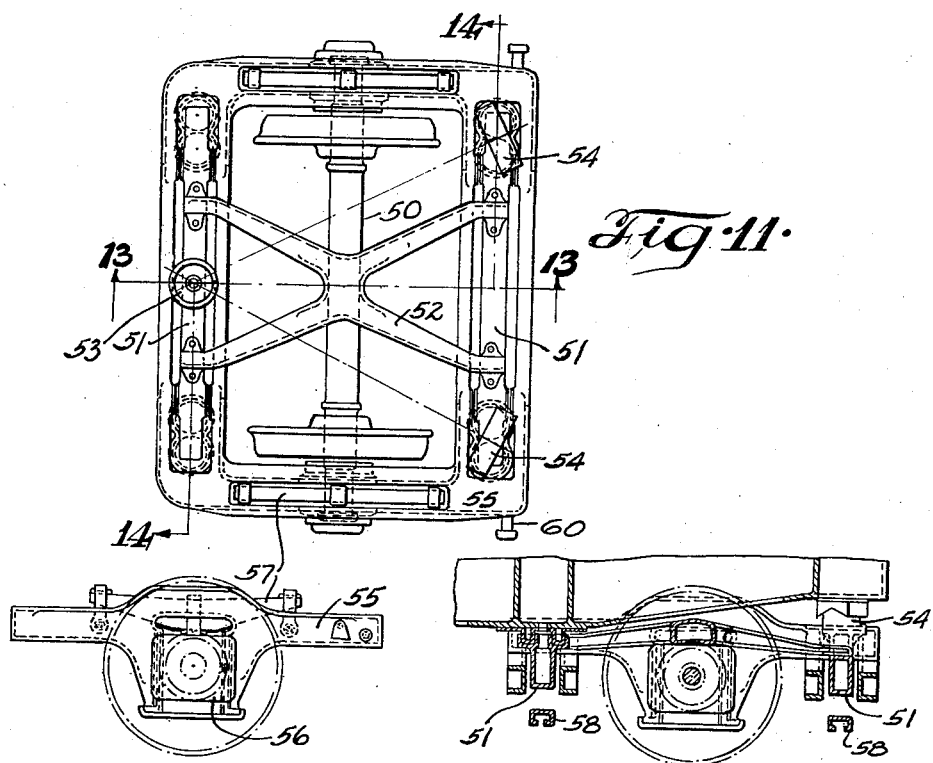
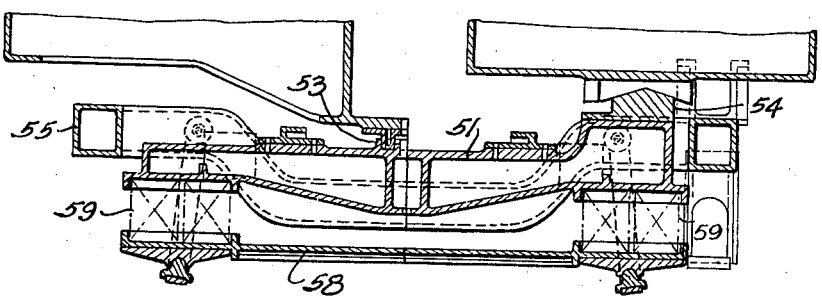
INVENTOR
Harry M. Pflager
BY Rodney Bedell
ATTORNEY Feb. 22, 1938. H. M. PFLAGER 2,109,276
RAILWAY VEHICLE STRUCTURE
Filed Jan. 12, 1935 5 Sheets-Sheet 5

INVENTOR
Harry M. Pflager
By Rodney Bedell
ATTORNEY

Patented Feb. 22, 1938

2,109,276

UNITED STATES PATENT OFFICE 2,109,276

RAILWAY VEHICLE STRUCTURE

Harry M. Pflager, St. Louis, Mo., assignor to General Steel Castings Corporation, Granite City, Ill., a corporation of Delaware Application January 12, 1935, Serial No. 1,481

36 Claims. (Cl. 105—4)

This invention relates to railway rolling stock and consists particularly in novel supporting structure for the end of a railway vehicle.

There is an increasing demand for light weight trains having cars in which the total weight of a car and its lading is so light that the car can be carried on two pairs of wheels and two axles. To meet this demand, light weight trains of articulated car construction are being built with a four-wheel truck under the leading end of the first car and a four-wheel truck under the rear end of the last car, with the adjoining ends of adjacent cars carried on one truck of the usual four-wheel type in common use on railroads.

These trains operate satisfactorily under normal conditions. In the event of a hot box or defective journal, wheel, or any other truck part, the entire train must be set on a side track until provisions can be made for raising the car body and removing the defective journal, wheel, etc., and the entire train is out of service until it can be repaired. It is impossible to separate the train or to add a car or take a car out of the train without taking the train to the shop where it can be jacked up and the car moved on temporary trucks or another car on temporary trucks added to the train.

I am aware that in Europe many light weight passenger cars are carried on two pairs of wheels and axles, there being one pair of wheels and an axle near each end of the car. The axles and boxes are mounted in rigid pedestals secured to the car body. Semi-elliptic or other springs are usually mounted on the axle boxes to support the car body. This construction, however, does not give satisfactory riding qualities because the vertical shocks are transmitted to the car body directly through the springs mounted on the axle boxes and horizontal shocks are delivered through the pedestals directly to the body. The car body cannot swing laterally relative to the wheels or track, the same as cars with ordinary swing motion trucks, so as to absorb or cushion the transverse forces when the cars are rounding curves and to absorb transverse and vertical shocks due to irregularities in the track.

The main object of the present invention is to provide a car mounted on a pair of lateral motion trucks, one at each end of the car, at least one, but usually both, of said trucks having but one axle and a pair of wheels, the car having the same easy riding qualities attained by the use of the swing motion four-wheel or six-wheel truck now commonly used on cars in the United States and Europe.

Another object of the invention is to provide an articulated car or train assembly in which one car can be added to the train or taken out of the train readily and independently of the adjacent cars without requiring cranes or special trucks, and without duplicating for each of the adjacent car ends the truck structure previously provided for the two ends as an assembled unit.

Another object is to provide a car body and two-wheel truck construction in which the load of the car is transmitted from the car body equally to longitudinally spaced truck bolsters mounted on elliptic springs swingingly supported by the truck frame and in which the truck frame is supported by shock absorbing springs mounted on the journal box, the object of the swinging arrangement for the bolsters and the elliptic springs being to provide lateral swinging movement of the car body relative to the wheel or track so as to absorb or cushion transverse shocks when cars are rounding curves or due to irregularities of the track.

This is accomplished by providing a car body with means on the ends of cars for coupling to an adjacent car, said car body being carried at each end on a two-wheel truck by pivoted connection on one side of the axle and a slidable bearing at two points on the other side of the axle, providing a three-point bearing swiveling truck under each end of the car. The truck is provided with two bolsters, one on either side of the axle with pivotal point and bearing preferably on said bolsters, said bolsters being supported near their ends on springs, which springs are mounted on spring planks which in turn are supported on swing hangers from the truck frame, said truck frame being supported by other springs interposed between the journal boxes and the truck frame.

Another object is to obtain practically the same functioning of adjacent trucks, individual to their respective cars, as is had on an articulated train where the adjacent ends of two cars are mounted on a single truck. This is accomplished by connecting the ends of the cars together and having the two adjacent two-wheel trucks, coupled together, holding the two truck frames in alinement whereby they act as a single four-wheel truck.

In cars of this construction, by coupling two adjacent trucks under each end of the car, the trucks will act as one four-wheel truck, maintaining both truck frames tangent to the track. This is accomplished by connecting the two truck frames together with hooks, links, or other similar arrangement whereby the trucks may be connected or disconnected readily in yards or stations.

These and other more detailed objects are attained by the structures illustrated in the accompanying drawings, in which—

Figure 1 is a top view of one two-wheel truck of one car and of the end of the underframe of the adjacent car, and also showing the two-wheel truck beneath said underframe.

Figure 2 is in part a longitudinal vertical section and in part a side elevation of the structure shown in Figure 1 and is taken on the line 2—2 thereof.

Figure 2a is an enlarged detail side view of the adjacent ends of the two trucks showing the means for interconnecting the same.

Figure 3 is a transverse vertical section taken approximately on the line 3—3 of Figure 1.

Figure 4 is an end elevation of one-half of the front of the truck and underframe assembly shown in Figures 1 and 2.

Figure 5 is a top view, and Figure 6 is a side elevation of a modified arrangement of side bearing which may be used in the assembly illustrated in the other figures.

Figure 11 is a top view of a modified form of truck.

Figure 12 is a side elevation of the same.

Figure 13 is a longitudinal vertical section taken on the line 13—13 of Figure 11 and showing also a portion of the body structure.

Figure 14 is a transverse vertical section taken approximately on the line 14—14 of Figure 11 and showing also a portion of the body structure.

Figure 7:
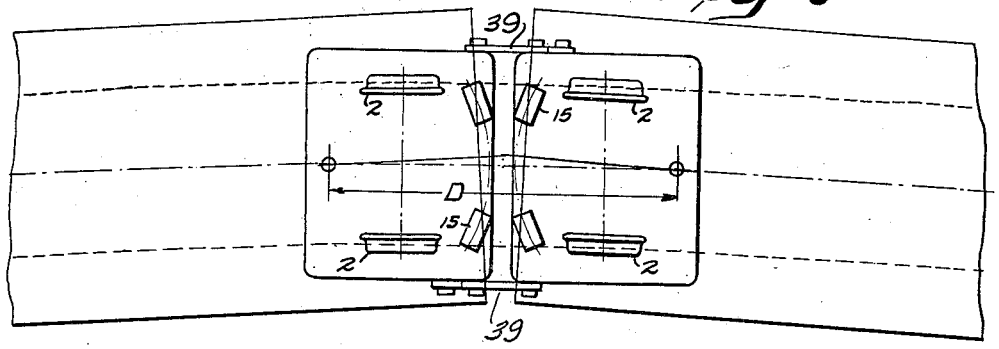
Figure 7 is a plan of a curved section of track showing the position of the two adjacent trucks of one car in the position which would be assumed in operation on such a curve.
Figure 8:
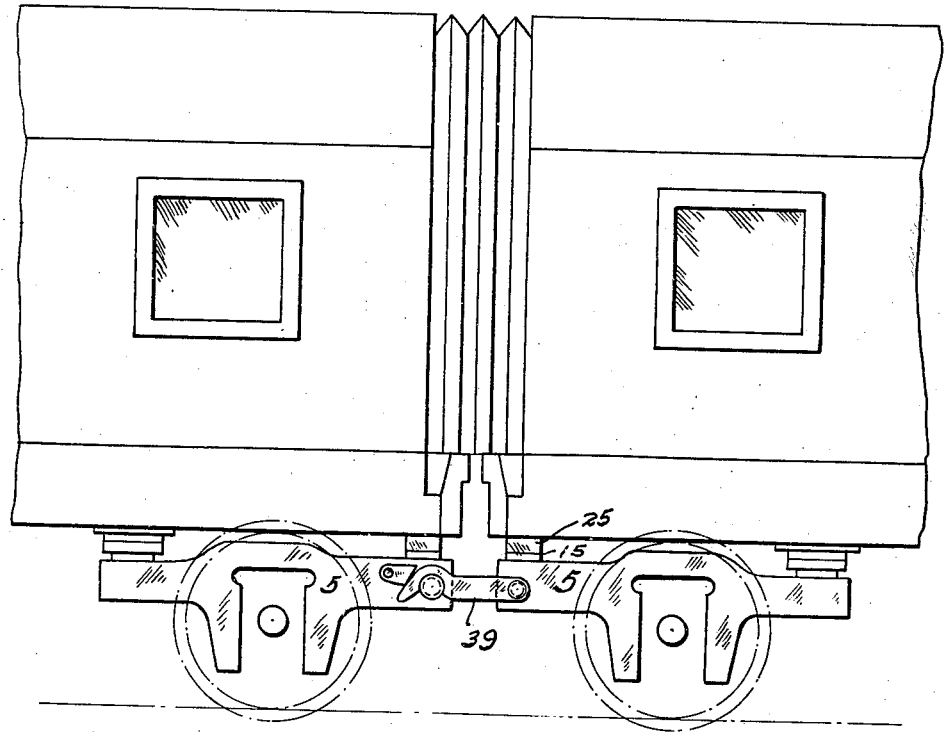
Figure 8 is a side elevation of the structure shown in Figure 7.

Each of the trucks illustrated supports the end of the corresponding vehicle independently of the other truck. Each truck includes a single axle 1, mounting a single pair of wheels 2, carrying journal boxes 3. These boxes are illustrated as of the roller bearing type, but this type of box is not essential. Each box forms a seat for a group of preferably coiled springs 4 and the truck frame is yieldingly supported by these springs. Each truck frame includes wheel pieces 5 and a pair of transoms 6—6 and 7—7 at each end, respectively. Pedestal jaws 8 depend from wheel pieces 5 and slidably embrace the journal boxes. A pair of swinging hangers 9 depend from each pair of transoms and pivotally support a spring plank 10 mounting the leaf springs 11. Bolsters 12 and 13 are carried by the spring planks 10 between transoms 6—6 and 7—7, respectively. Bolster 12 is provided with a center plate 14, and bolster 13 is provided with side bearings 15 spaced transversely of the longitudinal center line of the vehicle. The center plate or bearing 14 and the two side bearings 15 form a three point support for the end of the car body, and when the car body is applied to the truck, the truck frame is held stably against undue rotation about its axle 1.

The only part of each car body illustrated is the end portion including the center sill 20, the transverse transom or bolster 21, an end sill 22, and side members 23 connecting the bolster and end sill. Bolster 21 is provided with a center plate 24 arranged to seat in the truck center plate 14. A center pin or king pin (not shown) passes through center plates 14 and 24 and the truck pivots about the common axis of the center plates. The end sills are provided with side bearing elements 25 arranged to slidably engage the truck side bearing elements 15. By inclining the opposing faces of elements 15 and 25, as shown in Figures 3 and 4, the same act (through the spring mounting of their supporting bolster) to yieldingly resist relative transverse movement of the truck and underframe thereby functioning as a centering device. This three-point mounting of the car body on the truck stabilizes the car, giving equal loading on each of the journals.

Stops 26 and 27 on the body underframe and truck transom, respectively, are disposed to oppose each other so that they engage at a predetermined point to limit the relative pivotal movement of the truck and body.

A coupler 29 is mounted on the end of the underframe beneath the upper portion 28 thereof and preferably this coupler is constructed and arranged so that the car may be coupled to the ordinary railway car now in general use, as well as to another car of identical construction.

Preferably the two trucks are interconnected so that they may be held in alinement, or, in other words, so that their axles may be held parallel and act as the two axles of a four-wheel truck in riding over curved track.

The right hand outer corner of each truck is provided with a pivoted link 39 with a hooked outer end, and the left hand outer corner of each truck is provided with a pin 40 adapted to be engaged by the hook or link 39. A locking pawl 41 holds the hook and pin in assembled position. The pivotal mounting of link 39 may include an elongated slot for the mounting pin 42 to provide for some play between the frames and particularly to accommodate a condition, as illustrated in Figure 7, wherein the distance D between the two center pins is slightly less than the distance between the center pins when the cars are on straight track.

When adjacent trucks are not coupled together, links 39 will be turned back on the truck frame towards the journal box where they will not interfere in any way with the operation of the truck when connection to an adjacent truck is not desired.

Figure 10:
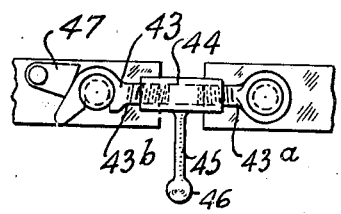
Figure 10 is a side view of the adjacent ends of two trucks showing a modified means for interconnecting the same.
Figure 9:
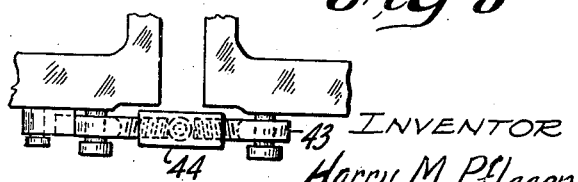
Figure 9 is a top view.

Figures 9 and 10 illustrate a modified connection between the trucks in which the right hand outer corner of each truck has a pivoted link 43 consisting of an eye 43a, a hook 43b, and a turnbuckle 44. Eye 43a and hook 43b are threaded as indicated (the threads on one part being right hand and the threads on the other part being left hand).

The turnbuckle may include an outwardly projecting arm 45 for rotating it, and a weight 46 on the outer end of the arm will prevent the buckle from turning accidentally and loosening the connection because of jars and other motions of the truck. This link may be held in position by the locking pawl 47 or any other locking means.

The arrangement of the center plate and side bearings on independently swinging truck bolsters provides for lateral swing of the car relative to the wheels and rail and for pivotal movement of the car bodies relative to the trucks and rail, and cushions the forces transmitted from the rail to the body of the car. While this arrangement is substantially different than that used for the usual four and six wheel trucks in which there is a single body support located between a pair of axles, yet the same riding qualities are obtained because the bolsters are preferably supported on elliptic springs and the truck frame is preferably supported on coil springs similarly to the arrangement in the usual four and six wheel trucks.

While the center plate 14 is at the inner end of the truck and the side bearings 15 are at the outer end of the truck, it will be understood that this arrangement may be reversed or, in other words, the truck may be rotated 180 degrees and the car center plate 24 located on the end sill with any of the constructions described.

The modified side bearing illustrated in Figures 5 and 6 includes a box 30, near the end of the truck bolster 31, which journals a roller 32 which supports the body side bearing plate 33 mounted on the underside of the end sill 34. This provides an anti-friction side bearing and the centering feature is eliminated. The body side bearing or the adjacent portion of the body underframe may include stops 35 arranged to engage the sides of the box 30 on the truck bolster and thereby limit relative lateral movement of the truck and body.

Another arrangement is shown in Figures 11 to 14 in which the truck includes a single axle 50 and spaced swinging bolsters 51 at opposite sides of the axle but a brace member 52 is rigidly secured to both of the swinging bolsters and provides for their movement as a unit transversely of the truck while the bolsters may have relative vertical movement in response to the spring action and the inclination of the car body. The left hand bolster has the center plate 53 forming one point of support for the car body, and the right hand bolster has the two inclined side bearings 54 forming the other two points of support and constituting a centering device for the truck.

In this construction, the truck frame 55 is supported upon the journal boxes 56 through leaf springs 57 and the bolsters 51 are carried on the spring planks 58 by means of coiled springs 59. While either end of the truck may be adjacent to the front of the car, the location of pins 60 indicates the forward end of the truck.

Figure 15:
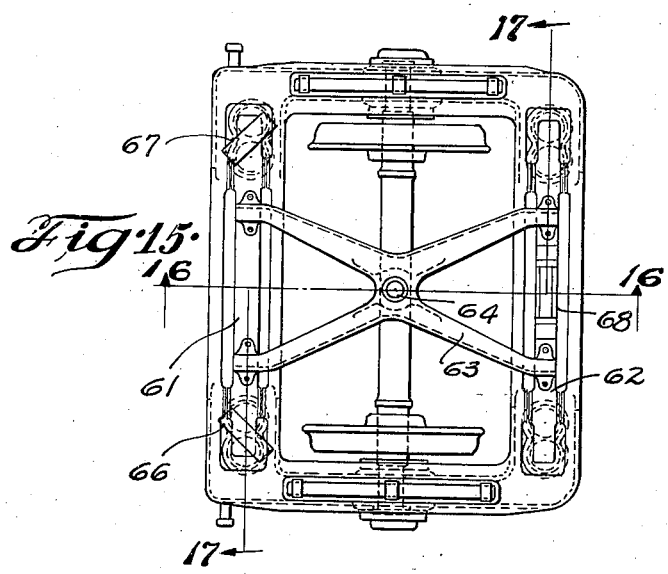
Figure 15 is a top view of another form of truck.
Figure 16:
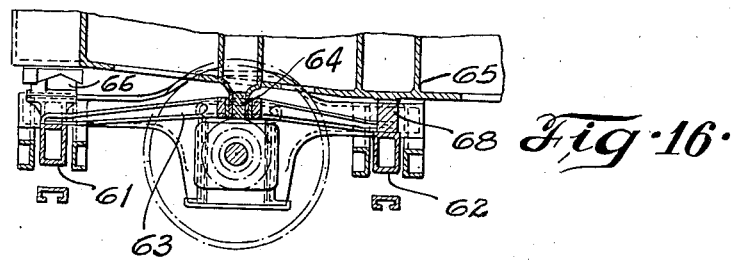
Figure 16 is a vertical longitudinal section taken on the line 16—16 of Figure 15 and showing also a portion of the body structure.
Figure 17:
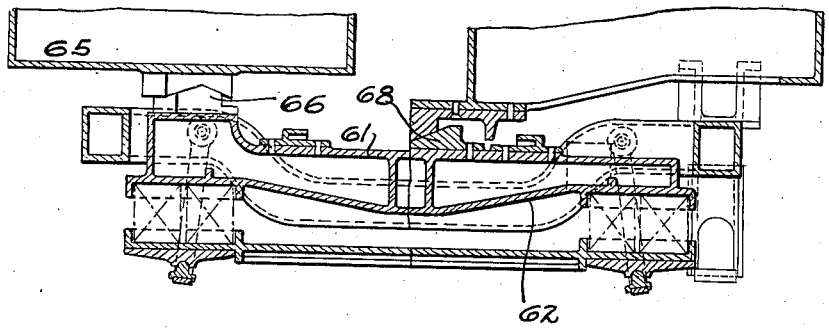
Figure 17 is a vertical transverse section taken approximately on the line 17—17 of Figure 15 and showing also a portion of the body structure.

Figures 15 to 17 illustrate a truck resembling that shown in Figures 11 to 14 in having the two swinging bolsters 61 and 62 rigidly connected by brace member 63 whereby the swinging bolsters will move as a unit transversely of the truck. But in this form of the invention, the pivotal connection between the truck and body comprises a pivot structure 64 located intermediate bolsters 61 and 62 and having no supporting function. The car body 65 is supported on the three bearings 66, 67, and 68, bearings 66, 67 and 68 being inclined to provide the centering feature previously referred to.

In each form of the invention, the spring suspension of the truck at one end of the car functions independently of the spring suspension of the truck at the opposite end of the car. The end portions of the car bodies and their trucks can be disengaged and each car can be moved along the track independently of other cars and hence the advantages of easily associated units are retained. The truck structure and adjacent body structure for the articulated unit is simplified without foregoing any of the advantages of the lateral motion four-wheel truck now used in articulated car structure for supporting the adjacent ends of two car bodies.

While each of the trucks illustrated is shown as provided with means for securing the same to an adjacent truck whereby the two trucks form the equivalent of a four-wheel truck having a rigid frame holding the axles substantially parallel and resulting in the wheels being maintained tangent to curved track, it is to be understood that all features of the invention are not limited to the use of interconnected trucks as illustrated.

The truck coupling links may be omitted and the cars operated with each truck free to pivot on its car body independently of the other truck.

Figure 7 illustrates diagrammatically the inclination of each truck relative to its body when the car is on curved track and also illustrates how the connecting links for the two-wheel trucks causes them to function as a single four-wheel truck.

Rocker or roller centering devices similar to those in general use may be substituted for the friction center device illustrated.

The body underframe or platform structure, the truck frame, the bolsters, and the spring planks are each shown as comprising a one-piece casting and this structure is preferred because of its simplicity, strength, and the possibility of distributing the metal most advantageously according to the forces applied to the different parts and of shaping the contours of the elements to accommodate adjacent parts of the assembled structure, but the invention is not dependent upon this type of integral casting structure.

The structures illustrated may be modified other than as shown in many of the details without departing from the spirit of the invention, and the exclusive use of such modifications as come within the scope of the appended claims is contemplated.

I claim:
1. In a railway vehicle, a body, and a two-wheel truck carrying one end of said body independently of other trucks, said truck comprising a frame mounted on the wheels, and structure carried thereby and movable laterally thereof and including a three point support for said body.

2. In a railway vehicle, a body structure, and a two-wheel truck including a frame and spaced bolsters mounted to swing in said frame, each of said bolsters having an individual element directly engaging and supporting said body structure.

3. In a railway vehicle, a body, and a two-wheel truck including structures supportably engaging one end of said body at points spaced apart longitudinally of said body, the supporting structures swinging laterally of the truck and yielding vertically independently of each other.

4. In a railway vehicle, a body, and a two-wheel truck at each end of said body, each truck including spring mounted structure forming a three point support for the adjacent portion of said body, and said structure of each truck being movable transversely of the truck independently of the structure of the other truck.

5. In a railway vehicle, a two-wheel truck including a single axle and a frame tilting about said axle, structures located forwardly and rearwardly of said axle, each of said structures having independent yielding support on said truck frame, a body end structure supported on said structures and pivotally connected with one of said structures so as to provide for relative swinging in a horizontal direction about the same.

6. In a railway vehicle, a body, and a two-wheel truck including a plurality of swing bolsters spaced longitudinally of the vehicle, and individual elements on said bolsters engaging and supporting one end of said body.

7. In a railway vehicle, a body, and a two-wheel truck including a plurality of relatively movable bolsters spaced longitudinally of the vehicle and supporting one end of said body, one of said bolsters having a body support element intermediate its ends, and the other of said bolsters having body support elements spaced apart longitudinally of the bolster.

8. In a railway vehicle, a body having transversely spaced support elements and a single support element spaced therefrom longitudinally of the vehicle, and a two-wheel truck having relatively movable bolsters spaced apart longitudinally of the vehicle, one of said bolsters having bearings for engagement with said transversely spaced body support elements, and the other of said bolsters having a bearing for engagement with said single body support element.

9. The combination of a car body having a coupler at its end and a two-wheel truck including a plurality of swing bolsters individually engaging and supporting the end portion of said body adjacent said coupler.

10. The combination of a car body and a two-wheel truck, said car body having a buffer beam at one end and a coupler mounted on said buffer beam, transversely spaced bearings on the under side of said buffer beam, and another single bearing spaced inwardly of said transversely spaced bearings, said truck having longitudinally spaced swing bolsters, one of said bolsters having spaced body supports for engagement with said transversely spaced bearings, and the other of said bolsters having a single body support for engagement with said single bearing.

11. A two-wheel truck having a plurality of bolsters each supported near the sides of the truck and having independent lateral motion and arranged to support a car body at three points.

12. A two-wheel lateral motion truck having a plurality of swing bolsters spaced longitudinally of the truck and adapted to support a car body at three points.

13. A two-wheel lateral motion truck having a pair of spaced swing bolsters arranged so as to provide a truck center plate at one end of the truck and transversely spaced body supports at the other end of the truck.

14. In a two-wheel truck, a frame, bolsters spaced longitudinally of the truck, swing hangers supporting said bolsters from said frame, one of said bolsters having a center bearing, and the other bolster having body supporting elements spaced transversely of the longitudinal center line of said truck.

15. In a two-wheel truck, a frame having side members with pedestals, a pair of transoms at each end connecting the ends of said side members, a bolster between each pair of transoms, one of said bolsters having a single body supporting bearing intermediate its ends arranged to permit swiveling motion of said truck about said bearing, the other bolster having transversely spaced bearings for supporting the car body and arranged to permit lateral movement of said truck relative to the car body, and swing hangers supporting said bolsters.

16. In a two-wheel truck, an axle, springs carried thereby, a frame supported by said springs and extending therefrom transversely of said axle, structures supported by said frame forwardly and rearwardly of said springs and movable transversely of said frame, springs carried by each of said structures, and individual body engaging and supporting elements carried by said latter-mentioned springs.

17. In a two-wheel truck, an axle, springs carried thereby, a frame supported by said springs and extending therefrom transversely of said axles, depending links pivoted on said frame forwardly and rearwardly of said springs and swinging transversely of said frame, springs carried by said links, and body engaging and supporting elements carried individually by said latter-mentioned springs.

18. A two-wheel lateral motion truck having a plurality of relatively movable bolsters, there being a body supporting element on one of said bolsters and a plurality of body supporting elements on another of said bolsters.

19. In a railway truck, a plurality of bolsters movable relative to each other transversely of the truck, elements on both of said bolsters for supporting a vehicle body, one of said elements also constituting a pivotal connection for the vehicle body.

20. In a railway truck, a plurality of relatively movable bolsters, body supporting elements on one of said bolsters spaced from the longitudinal center line of the truck, and a body supporting element on the other of said bolsters at the longitudinal center line of the truck.

21. A lateral motion truck having structure as specified in claim 20 which also includes a rigid longitudinal connection between the bolsters.

22. A two-wheel lateral motion truck having a plurality of relatively movable bolsters constructed and arranged to support a car body at three points on said bolsters, there being means for pivotally connecting the truck to a vehicle body at a point intermediate said bolsters.

23. In a railway train, a plurality of car bodies directly connected together, individual two-wheel trucks under the end portions of said bodies, each truck having a single axle, a frame and a bolster movable thereon, the adjacent trucks being connected together so that the axles of said trucks are rigidly held substantially parallel to each other.

24. In a railway train, a plurality of car bodies directly connected together, individual two-wheel trucks under the end portions of said bodies, the trucks under the end portions of the adjacent bodies being rigidly spaced from each other so that the wheels of said trucks will extend substantially tangent to curved track.

25. In a railway train, a plurality of car bodies directly coupled together and having individual two-wheel trucks under their adjacent ends, each truck having a single axle, a frame and a bolster movable thereon, said trucks being connected together so that the axles of said trucks will be rigidly held substantially parallel to each other and so that the wheels of said trucks will extend in a line substantially tangent to the track when the cars are on a curve, each of said trucks being constructed and arranged to independently support the corresponding end portion of each car body when the cars are separated.

26. In a railway train, a pair of car bodies coupled together at their adjacent ends, individual two-wheel trucks under the adjacent end portions of said bodies, said trucks including structure arranged to provide for lateral motion of the wheels and axles relative to said bodies and being coupled direct to each other so that the wheels extend in a line substantially tangent to the track when rounding curves, said lateral motion structure having means cushioning the lateral forces between the wheel flanges and the body.

27. In a railway train, a plurality of car bodies directly connected to each other, individual two-wheel trucks for said bodies under adjacent end portions of said bodies, each of said trucks having a single axle, a frame and a bolster movable thereon and being constructed and arranged to pivot on said body and each frame being arranged to connect to the adjacent truck so that the axles of said trucks are rigidly held substantially parallel to each other and the wheels of said trucks are held in alinement.

28. In articulated car construction, car bodies having coupling structure on their adjacent ends securing said ends together, an individual yielding support for each of said car bodies adjacent said coupling structure, an individual yielding support for each of said car bodies at a point spaced substantially from said first-mentioned support, and a single wheeled axle mounting said supports for each of said car bodies.

29. In a two-wheel lateral motion truck, an axle, lateral swinging members on each side of said axle, said members including individual elements for supporting engagement with a car body, and another member connecting said first-mentioned members so that they move as a unit transversely of the truck.

30. In a two-wheel lateral motion truck, an axle, lateral swinging members on each side of said axle, said members including individual elements for supporting engagement with a car body, one of said elements also constituting a pivotal connection for said body, and another member connecting said first-mentioned members so that they move as a unit transversely of the truck.

31. In a two-wheel lateral motion truck, an axle, lateral swinging members on each side of said axle, said members including individual elements for supporting engagement with a car body, and another member connecting said first-mentioned members so that they move as a unit transversely of the truck, there being means on said second-mentioned member for pivotally connecting the truck to the vehicle body at a point above said axle.

32. Structure as described in claim 31 in which said pivotal means is located at a point intermediate said first-mentioned members.

33. In a railway vehicle, a body including a rigid underframe, and a two-wheel truck carrying one end of said body and having a frame and structure yieldingly supported thereon to move laterally of the truck wheels and including three triangularly spaced support elements directly engaging said body underframe.

34. A railway vehicle as specified in claim 33 in which one of the support elements comprises a pivotal connection between the body and truck.

35. A truck and car supporting means for the adjacent cars of an articulated train, the truck having segments pivotally engaged to the car supporting means at one end thereof, means for supporting the car supporting means from other parts of the truck segments for transverse pivotal movement of the truck segments, means for coupling the said cars and means independent of the car coupling means for coupling the truck segments, the means for coupling the cars being adjacent the means for coupling the truck segments.

36. In a truck for the adjacent cars of an articulated type train, two truck segments each pivotally attached to its respective car, coupling means for securing the said segments together to form a single truck free from relative lateral oscillations of said segments, and adjacent means independent of the truck connecting means for securing the said adjacent cars together.

H. M. PFLAGER.